Sept. 17, 1946.  W. T. GOODBY  2,407,741
SCREW-THREADED MEMBER
Filed April 6, 1944

Inventor
William T. Goodby
by Wilkinson & Mawhinney
Attorneys

Patented Sept. 17, 1946

2,407,741

UNITED STATES PATENT OFFICE 2,407,741

SCREW-THREADED MEMBER

William Thomas Goodby, Bristol, England, assignor to The Bristol Aeroplane Company Limited, Bristol, England, a British company Application April 6, 1944, Serial No. 529,812
In Great Britain April 2, 1943

7 Claims. (Cl. 151—22)

This invention concerns screw-threaded members of the type in which upon the male member being screwed into the female member one of said members is forced into intimate contact with the other to lock the members against separation.

According to the present invention the male and female members are each so formed that upon the male member being screwed into the female member they co-act to displace the material of the female member and produce a collar whose diameter is less than the crest diameter of the threads of the male member, and whose function is to lock said members against separation.

According to another feature of the present invention the male member is screw-threaded over part of its length and is formed over another part of its length with an unthreaded portion whose diameter lies between the crest and trough diameters of the screw-thread, the arrangement being that upon said member being screwed into the female member said unthreaded portion engages the threads of the female member thereby displacing them to form a locking collar which prevents separation of the two members.

According to yet another feature of the invention the male member is formed with a shoulder against which the material of the female member is adapted to be forced whilst said collar is being produced.

Figure 1:
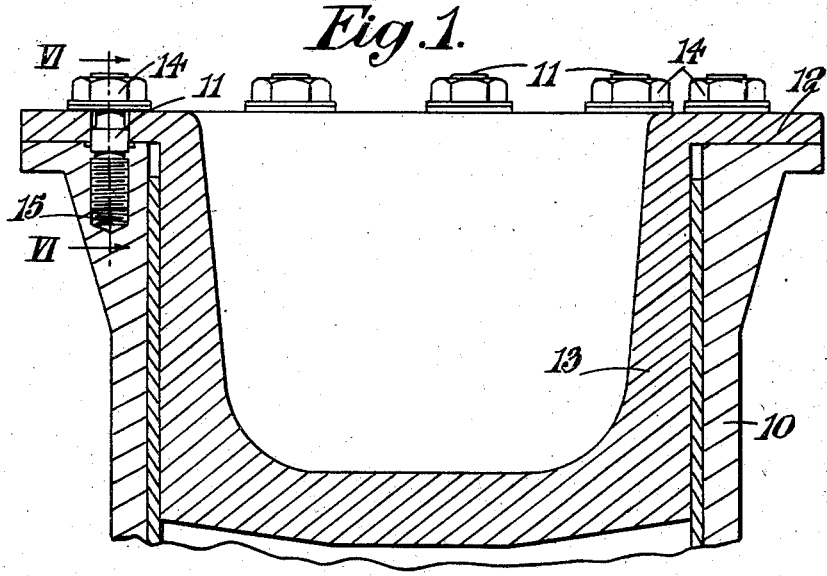
Figure 2:
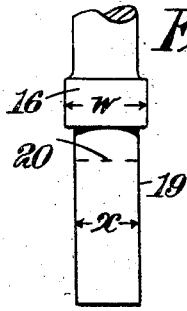
Figure 3:
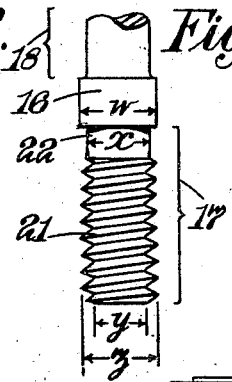
Figure 4:
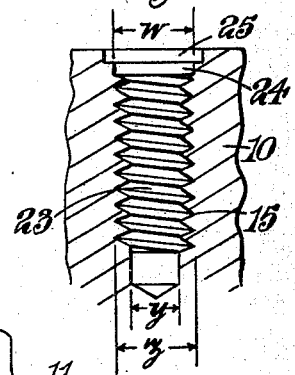
Figure 5:
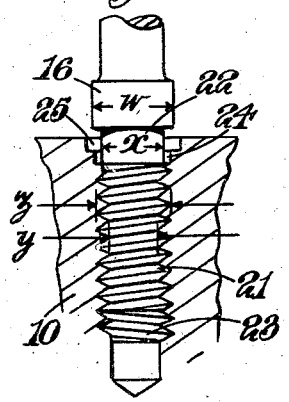
Figure 6:
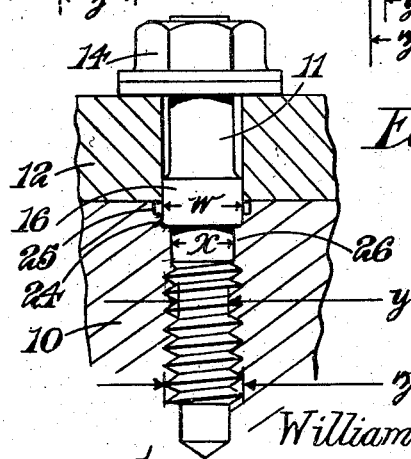

A specific embodiment of the present invention as applied to the holding-down studs for a junk-head of a sleeve-valve internal combustion engine will now be described merely by way of example with reference to the accompanying drawing of which:

Figure 1 is a sectional elevation of a cylinder and junk-head assembly in which the latter is secured to the former by holding-down studs in accordance with the present invention, Figure 2 is an enlarged view of a blank from which the holding-down studs are produced, Figure 3 shows a holding-down stud which has been produced from said blank, Figure 4 is a sectional elevation of a stud hole which is adapted to receive the holding-down stud shown in Figure 3, Figure 5 is a sectional elevation of a stud hole with a stud partly inserted therein, and Figure 6 is a section on the lines VI—VI of Figure 1, this figure being to an enlarged scale for the sake of clarity.

Referring to the drawing; the cylinder 10 of the internal combustion engine receives a plurality of spaced studs 11, said studs protruding from the end face of the cylinder and passing through a corresponding number of holes in the holding-down flange 12 of the junk-head 13. The flange of the junk-head is clamped into intimate contact with the end of the cylinder by nuts 14 carried on the studs 11. It is a common practice to provide an interference fit between the studs 11 and their associated stud holes 15 with a view to ensuring that the studs do not work loose during operation of the engine. The present invention aims at providing an improved form of lock for said studs.

According to the present invention each stud 11 is formed with a locating collar 16 which separates that portion 17 of the stud which is screwed into the cylinder from the portion 18 which protrudes therefrom to receive the holding-down nuts 14. The threads on the stud are formed by a thread-rolling operation in which a blank 19 (Figure 2) whose shank diameter $x$ is approximately equal to the effective diameter of the threads to be formed is rotated between a pair of rollers having the required thread form. The rollers form the material of the blank into troughs below the effective diameter and crests above the effective diameter. When producing the threads on the studs in this manner it is necessary to ensure that the threaded portion of the stud stops short of the locating collar 16 (for instance at 20) as otherwise there is a danger that the forming rollers will come into engagement with the collar with consequent damage to said rollers since the collar has a greater diameter $w$ than the shank of blank 19.

The stud which is produced from the blank 19 by the thread-rolling operation described above is shown in Figure 3. It will be noted that the part 17 of the stud which is to be screwed into the cylinder comprises a threaded portion 21, the locating collar 16 whose diameter $w$ is approximately equal to the crest diameter $z$ of the threads and lying between the threaded portion 21 and the collar 16 a plain portion 22 whose diameter $x$ is equal to the effective diameter of the screw-threads. The trough diameter of the threads is indicated at $y$.

To accommodate this stud, the stud holes 15 of the cylinder are each formed with a threaded portion 23 which is of greater length than the threaded portion 21 of the stud; an unthreaded portion 24 whose diameter is the same as the diameter of the locating collar 16 but whose depth is approximately one-fifth thereof, and a recessed portion 25 whose diameter is slightly greater than that of the unthreaded portion 24 (Figure 4).

The stud 11 is readily threaded into the stud hole 15 until the unthreaded portion 22 of the stud is brought into engagement with the threads of the stud hole (Figure 5). When the stud is screwed into the stud hole from this position, the unthreaded portion 22 squeezes the crests of the female threads lying above the effective diameter into their troughs thereby to produce a collar 26 whose diameter is the same as the diameter of the unthreaded portion. When the stud has been completely inserted in the stud hole 15, the collar 16 (as shown in Figure 6) fits tightly into the unthreaded portion 24, which is the same diameter as said collar, and passing through the recess portion 25 protrudes above the end face of the cylinder to receive the junk-head. The material forming collar 26 is consolidated when the locating collar 16 engages with and compresses it in an axial direction.

It will thus be appreciated that with a stud and stud hole of the constructions described there is formed on the insertion of the stud a locking collar 26 of material which is in intimate contact with the stud and whose diameter is greater than the trough diameter and less than the crest diameter of the male threads. This locking collar renders it difficult to unscrew the stud from the stud hole and also prevents the stud from working loose.

A further advantage of this construction resides in the ability to ensure that the height which the studs protrude from the cylinder is substantially constant. This is due to the fact that the degree of formation of the locking collar is a function of the depth to which the stud has been inserted and to the fact that its formation will in each case require the exertion of approximately the same torque. When the latter has reached a pre-determined value it therefore follows that the stud has entered into a stud hole to a pre-determined depth.

Although the invention has been described as applied to the holding-down studs for a junk-head of a sleeve-valve internal combustion engine it will be appreciated that the invention may be applied to many forms of screw-thread joints. Thus the invention has application to studs for supercharger casings, gear boxes, and the like and to threaded collets, pipe joints and spark-plug adaptors.

In putting the invention into effect the material of the female member of the joint may be of a more readily deformable material than the material of the male member such as aluminium, aluminium alloy or magnesium when the male member is of steel. Alternatively it may be of a similar material, for instance steel or cast-iron with a male member of steel. In the embodiment described above the cylinder is an aluminium alloy whilst the stud is of steel.

I claim:

1. A threaded coupling comprising a threaded male member or bolt, and a complementarily threaded socket or female member providing an anchorage for said bolt, said bolt comprising a threaded shank at the leading end of the bolt, a plain portion adjoining said threaded shank, a locating collar above the plain portion and an attaching portion above the collar, the diameter of said plain portion being approximately equal to the effective diameter of the threads of the shank portion, said socket having a threaded portion of greater length than the threaded shank of the bolt and being substantially of a length equal to the combined lengths of the threaded shank and plain portion of the bolt whereby when the leading end of the bolt is screwed into said socket throughout the full length of said threaded shank, such leading end of the bolt will still be above the lower end of the threaded socket and further rotation of the threaded bolt will cause the plain portion of the bolt to squeeze the crests of the socket threads lying above their effective diameter into their troughs.

2. A threaded coupling comprising a threaded male member or bolt, and a complementarily threaded socket or female member providing an anchorage for said bolt, said bolt comprising a threaded shank at the leading end of the bolt, a plain portion adjoining said threaded shank, a locating collar above the plain portion, and an attaching portion above the collar, the diameter of said plain portion being approximately equal to the effective diameter of the threads of the shank portion, the diameter of said locating collar exceeding that of the diameter of said plain portion, said socket having a threaded portion of greater length than the threaded shank of the bolt and being substantially of a length equal to the combined lengths of the threaded shank and plain portion of the bolt whereby when the leading end of the bolt is screwed into said socket throughout the full length of said threaded shank, such leading end of the bolt will still be above the lower end of the threaded socket and further rotation of the threaded bolt will cause the plain portion of the bolt to squeeze the crests of the socket threads lying above their effective diameter into their troughs, said socket having an unthreaded portion adjoining the upper end of the threaded portion and being of greater diameter than said threaded portion to receive the lower end portion of said locating collar.

3. A threaded coupling comprising a male member having a threaded portion, a locating collar and an unthreaded portion intermediate the threaded portion and the collar, said unthreaded portion being of a diameter substantially equal to the effective threaded diameter, and a socket member having a complementarily threaded portion deeper than the threaded portion of the male member whereby when the male member is screwed home said unthreaded portion will displace crests of threads of said socket member into the troughs thereof to form a locking collar around said unthreaded portion of the male member at the entry end of the socket member.

4. A threaded coupling comprising a threaded male member and a complementarily threaded female member of greater axial length than the male member for which it provides an anchorage, the male member having an unthreaded portion whose diameter is substantially equal to the effective diameter of the threads, a threaded portion disposed between said unthreaded portion and the end of the male member which enters the female member and a locating collar disposed on the other side of said unthreaded portion from said threaded portion, said unthreaded portion engaging the threads of the female member to displace the crests thereof into the troughs and form a locking collar which extends around said unthreaded portion at the entry end of the female member.

5. A threaded coupling as claimed in claim 4 in which the said locating collar on the male member is formed to provide a shoulder adjacent said unthreaded portion against which the material of the female member is adapted to be forced whilst said locking collar is being produced.

6. A threaded coupling as claimed in claim 4 in which the said locating collar on the male member is formed to provide a shoulder adjacent said unthreaded portion against which the material of the female member is adapted to be forced whilst said locking collar is being produced, and wherein the unthreaded portion of the male member lies between the threaded portion thereof and said shoulder.

7. A threaded coupling as claimed in claim 4 in which the female member is formed of a material which is more readily deformable than the material of the male member.

WILLIAM THOMAS GOODBY.